US010372535B2

(12) United States Patent
Lien et al.

(10) Patent No.: US 10,372,535 B2
(45) Date of Patent: Aug. 6, 2019

(54) ENCODING METHOD AND A MEMORY STORAGE APPARATUS USING THE SAME

(71) Applicant: Winbond Electronics Corp., Taichung (TW)

(72) Inventors: Chuen-Der Lien, San Jose, CA (US); Ming-Huei Shieh, San Jose, CA (US); Seow-Fong Lim, San Jose, CA (US); Ngatik Cheung, San Jose, CA (US); Chi-Shun Lin, San Jose, CA (US)

(73) Assignee: Winbond Electronics Corp., Taichung (TW)

( * ) Notice: Subject to any disclaimer, the term of this patent is extended or adjusted under 35 U.S.C. 154(b) by 86 days.

(21) Appl. No.: 15/688,865

(22) Filed: Aug. 29, 2017

(65) Prior Publication Data

US 2019/0065307 A1    Feb. 28, 2019

(51) Int. Cl.
*G11C 29/00* (2006.01)
*G06F 11/10* (2006.01)
*G06F 11/14* (2006.01)
*G06F 12/02* (2006.01)

(52) U.S. Cl.
CPC ...... *G06F 11/1068* (2013.01); *G06F 11/1489* (2013.01); *G06F 12/0246* (2013.01)

(58) Field of Classification Search
CPC ....... G11C 8/16; G11C 11/419; G11C 11/412; G11C 7/1006; G11C 7/1075; G11C 7/22; G11C 7/1051; G11C 29/42; G06F 11/1044; G06F 11/1068; G06F 11/1489; G06F 12/0246
See application file for complete search history.

(56) References Cited

U.S. PATENT DOCUMENTS

| 8,145,977 | B2 | 3/2012 | Lee | |
|---|---|---|---|---|
| 2007/0277066 | A1* | 11/2007 | Gajapathy | G06F 11/1044 714/724 |
| 2013/0339815 | A1 | 12/2013 | Anholt et al. | |
| 2014/0185364 | A1* | 7/2014 | Iyer | G11C 8/16 365/154 |
| 2015/0212877 | A1 | 7/2015 | Kern et al. | |

OTHER PUBLICATIONS

"Office Action of Taiwan Counterpart Application", dated Oct. 2, 2018, p. 1-p. 6.

* cited by examiner

*Primary Examiner* — Guerrier Merant
(74) *Attorney, Agent, or Firm* — JCIPRNET

(57) ABSTRACT

An encoding method for a memory storage apparatus adopting a Lien ECC scheme is provided. The memory storage apparatus comprises an ECC encoder using a Lien Code. The encoding method includes: receiving a first data or a second data which is one's complement of the first data; and performing an encoding operation based on the Lien Code by the ECC encoder. The encoding operation includes: if the first data is received, generating a first codeword according to the first data; and if the second data is received, generating a second codeword which is one's complement of the first codeword according to the second data. In addition, a memory storage apparatus using the encoding method based on the Lien Code is also provided.

14 Claims, 5 Drawing Sheets

ENCODING METHOD AND A MEMORY STORAGE APPARATUS USING THE SAME

BACKGROUND OF THE INVENTION

1. Field of the Invention

The invention relates to a memory storage device, and more particularly, relates to an encoding method and a memory storage apparatus using the encoding method.

2. Description of Related Art

Generally, data to be written to a rewritable non-volatile memory (NVM) may be encoded into a codeword according to an error correcting codes (ECC). The codeword read from the rewritable non-volatile memory may also be processed by a corresponding decoding procedure to restore to the data. The codeword, is usually a combination of the data itself and a parity data generated according to the Bose-Chaudhuri-Hocquenghem (BCH) code, the hamming code, the hamming code with additional parity (SECDED), the Reed-Solomon code, or the Hsiao code, etc.

For improving the reliability or the endurance of an NVM, a test engineer has to repeatedly cycle each memory cell of the NVM, such as to write an all-one and an all-zero pattern cyclically to every cells. In light of the foregoing, it is necessary to provide a mechanism for conveniently carrying out such testing procedure on an NVM adopting an ECC scheme.

SUMMARY OF THE INVENTION

Accordingly, the invention is directed to an encoding method and a memory storage apparatus using the encoding method. By adopting the encoding method, one's complement of a codeword may be easily obtained as another codeword from a same ECC encoder using a Lien Code. As a result, the memory storage apparatus using the provided encoding method can be conveniently tested and cycled.

An exemplary embodiment of the invention provides an encoding method for a memory storage apparatus adopting a Lien ECC scheme. The memory storage apparatus includes an ECC encoder using the Lien code. The encoding method includes: receiving a first data or a second data which is one's complement of the first data; and performing an encoding operation by the ECC encoder based on the Lien Code. The encoding operation includes: if the first data is received, generating a first codeword according to the first data; and if the second data is received, generating a second codeword which is one's complement of the first codeword according to the second data.

Another exemplary embodiment of the present invention provides a memory storage apparatus adopting a Lien ECC scheme. The memory storage apparatus includes a connection interface, a memory array and a memory control circuit. The connection interface is configured to couple to a host system. The memory control circuit is coupled to the connection interface and the memory array, and configured to receive a first data or a second data which is one's complement of the first data. The memory control circuit performs an encoding operation based on the Lien Code in response to the first data or the second data received, and the encoding operation includes: if the first data is received by the memory control circuit, generating a first codeword according to the first data; and if the second data is received by the memory control circuit, generating a second codeword which is one's complement of the first codeword according to the second data.

Based on the above, by adopting the encoding method and the memory storage apparatus provided in the invention, a pair of a codeword and one's complement of the codeword can be both easily generated based on the Lien Code. Accordingly, memory cells of the memory storage apparatus can be easily cycled, and the endurance of the memory storage apparatus can be conveniently tested.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
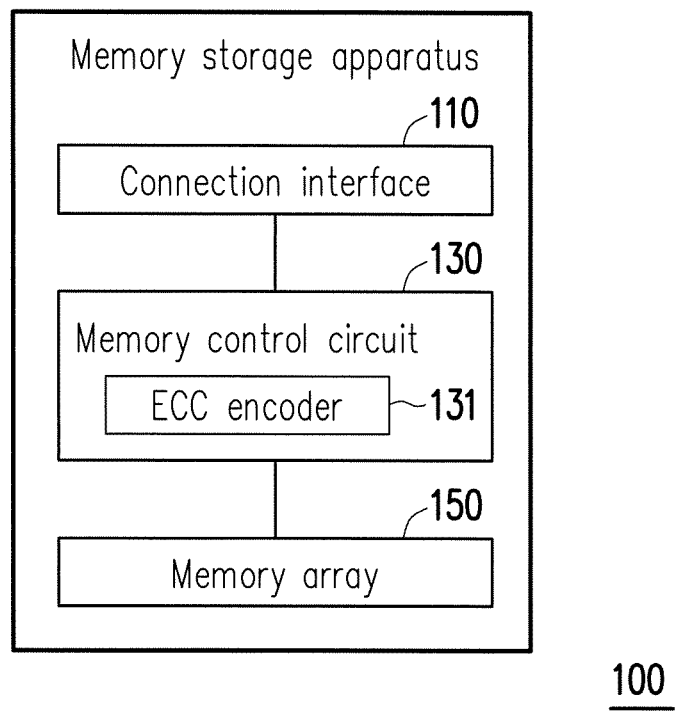
FIG. 1 is a schematic block diagram illustrating a memory storage apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, the memory storage apparatus 100 includes a connection interface 110, a memory control circuit 130, and a memory array 150. In one embodiment, the memory storage apparatus 100 is a rewritable non-volatile memory, and the memory array 150 includes a plurality of rewritable non-volatile memory cells.

In one embodiment, the connection interface 110 is configured to couple to a host system (not shown) through a Serial Advanced Technology Attachment (SATA) standard. In other embodiments, the connection interface 110 may comply with the Parallel Advanced Technology Attachment (PATA) standard, the Institute of Electrical and Electronic Engineers (IEEE) 1394 standard, or other suitable standards, which is not limited in the invention. In one embodiment, the connection interface 110 may be packaged with the memory control circuit unit 130 in one chip or laid outside a chip having the memory control circuit unit 130.

The memory control circuit 130 is coupled to the connection interface 110 and the memory array 150, and configured to execute a plurality of logic gates or control commands which are implemented in a hardware form or in a firmware form and perform operations such as data writing, reading or erasing in the memory array 150 according to the command of the host system. In one embodiment that the memory storage apparatus 100 is a rewritable NVM adopting a Lien ECC scheme, where the memory control circuit 130 further includes an ECC encoder 131 using a Lien Code for encoding the data received through the connection interface 110, so as to generate a codeword and store the same into the memory array 150, whenever the data is received for being written into the memory array 150 or for erasing the memory array 150. A feature of the Lien Code is that one's complement of a codeword generated by using the Lien Code is still another codeword generated by using the Lien Code.

The memory array 150 is couple to the memory control circuit 130 including a plurality of memory cells (e.g., rewritable non-volatile memory cells). In one embodiment, the host system transmits a write command to the memory storage apparatus 100 for writing data thereto, the memory control circuit 130 then encodes the data into a codeword corresponding to the data and store the codeword in the memory array 150, in response to the write command.

Figure 2:
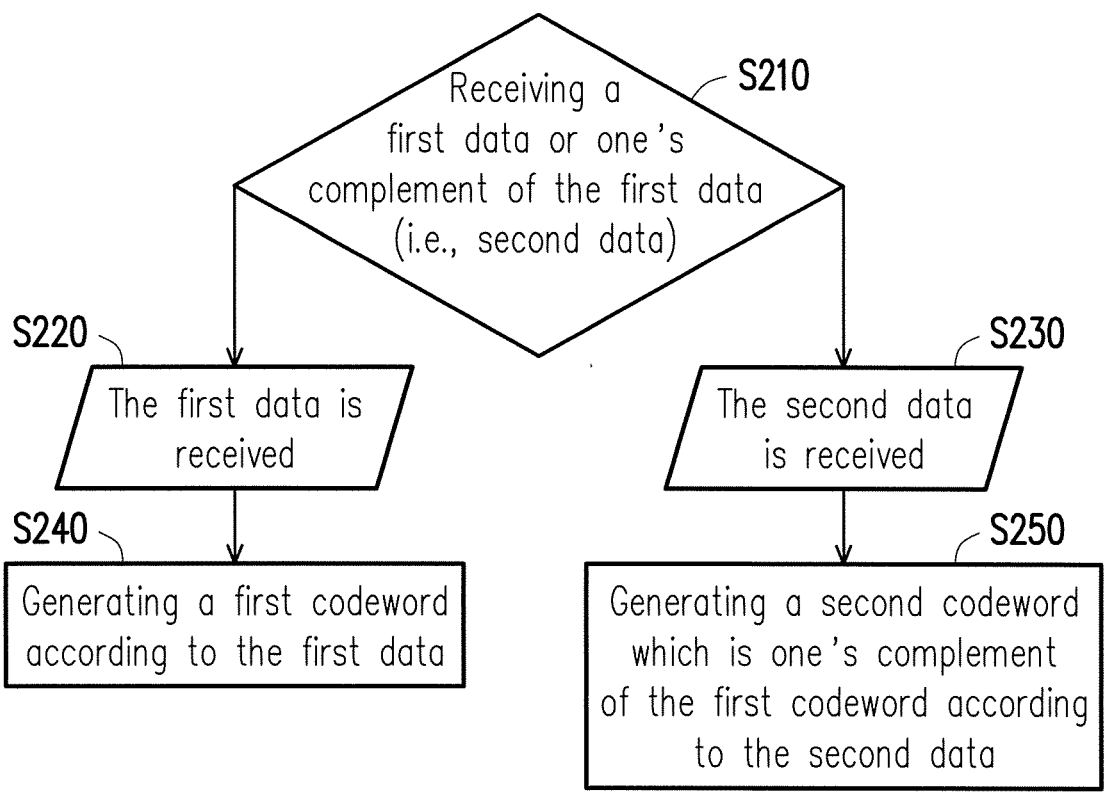
FIG. 2 is a flowchart illustrating an encoding method of the Lien Code according to an embodiment of the invention.

FIG. 2 is a flowchart illustrating an encoding method of the Lien Code according to an embodiment of the invention. The encoding method of the Lien Code may be performed by the memory storage apparatus 100 of the embodiment of FIG. 1. Therefore, the encoding method will be illustrated by referring to the aforementioned memory storage apparatus 100 in the present embodiment.

Referring to FIG. 2, the memory control circuit 130 receives a data (i.e., first data) or one's complement of the data (i.e., second data) (S210). In response to the received data, the ECC encoder 131 of the memory control circuit 130 performs an encoding operation on the received data based on the Lien Code. In detail, when the first data is received by the memory control circuit 130 (S220), the ECC encoder 131 generates a codeword (i.e., first codeword) according to the first data (S240), and when the second data is received by the memory control circuit 130 (S230), the ECC encoder 131 generates another codeword (i.e., second codeword) which is one's complement of the first codeword according to the second data (S250).

To be specific, the ECC encoder 131 may calculate a first parity data of the first data based on the Lien Code, and combine the first parity data and the first data to generate the first codeword in the step S240. On the other hand, the ECC encoder 131 may calculate a second parity data of the second data based on the Lien Code, and combine the second parity data and the second data to generate the second codeword in the step S250.

In one embodiment, the ECC encoder 131 receives a first data in an all-zero pattern, the first parity data of the first data calculated by the ECC encoder 131 is in the all-zero pattern, and the first codeword generated by the ECC encoder 131 is also in the all-zero pattern. On the other hand of this embodiment, once the ECC encoder 131 receives a second data in an all-one pattern, the second parity data of the second data calculated by the ECC encoder 131 will be in the all-one pattern, and the second codeword generated by the same ECC encoder 131 will be in the all-one pattern as well.

Advantageously, a test engineer can easily cycle the memory array 150 by using the ECC encoder 131 adopting the encoding method of Lien Code. For example, the test engineer may cyclically write data in the all-zero pattern and the all-one pattern through the connection interface 110, and the codewords in the all-zero pattern and the all-one pattern are thus cyclically generated and written into memory cells of the memory array 150. Therefore, the written memory cells may be flipped twice in each cycle. In addition, a codeword or data with a same length as a codeword stored in the memory array 150 can be easily erased by overwriting a codeword in an all-one pattern generated by the ECC encoder 131 using the Lien Code.

In another embodiment, the ECC encoder 131 receives a first data in a checkerboard pattern (e.g., 101010 . . . ), and the first parity data of the first data is calculated by the ECC encoder. Once the ECC encoder 131 receives a second data in an inverse checkerboard pattern (e.g. 010101 . . . ), the second parity data of the second data will be calculated as the one's complement of the first parity data by the ECC encoder 131.

Advantageously, one's complement of a codeword generated from the ECC encoder 131 of the embodiments of the invention is another codeword that can be generated from the ECC encoder 131. However, details of the formula or the algorithm applied by the ECC encoder 131 are not limited in the embodiments of the invention. People having skills in the art may implement their own ECC encoder 131 based on knowledges of mathematics. Several embodiments are introduced below for describing the provided encoding method of the Lien Code exemplarily.

Figure 3:
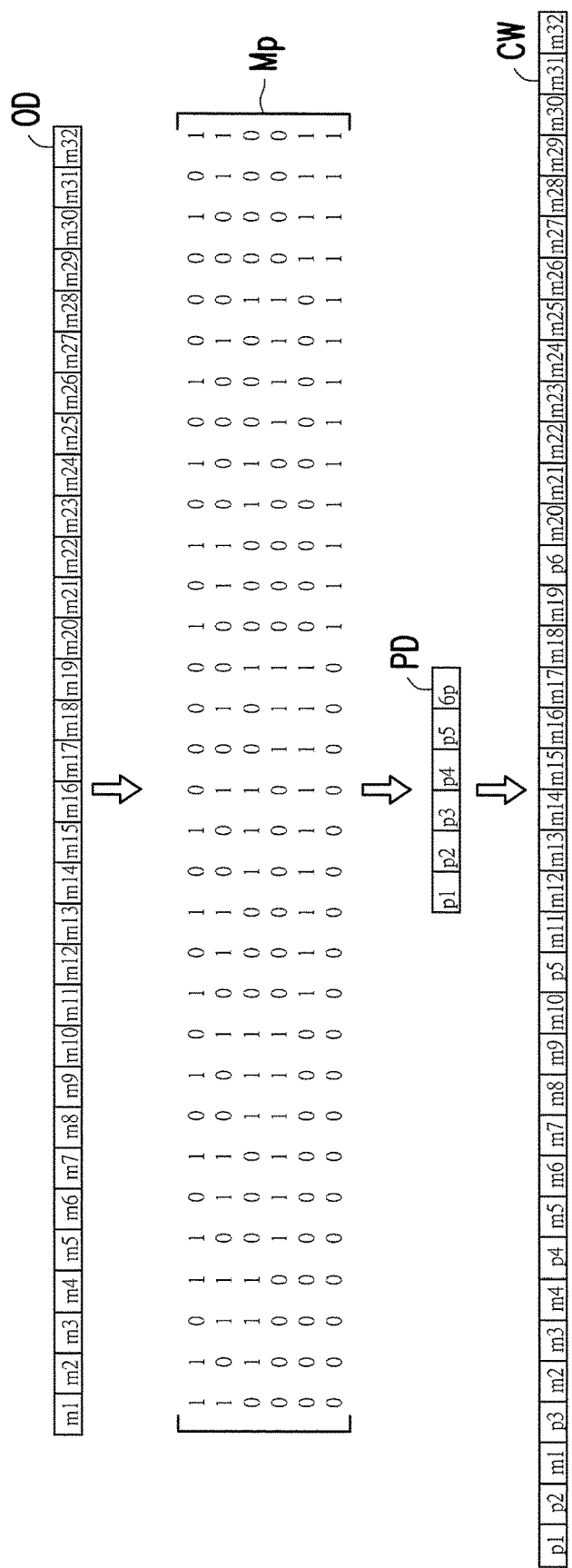
FIG. 3 is a schematic diagram illustrating an encoding method of a Lien Code modified by Hamming (38, 32, 3) according to an embodiment of the invention.

Referring to FIG. 3, based on the Lien Code modified by Hamming (38, 32, 3), the ECC encoder 131 encodes a 32-bit data OD into a 38-bit codeword CW, and the matrix Mp is a 6*32 matrix used for calculating a 6-bit parity data PD of the 32-bit data OD. To be specific, the 32-bit data OD may be written in a one-column vector with 32 elements m1 to m32, then multiplied by the matrix Mp, so as to obtain a one-column vector with 6 elements p1 to p6 each represents one bit of the 6-bit parity data PD. Then, the ECC encoder 131 mixes the 32-bit data OD and the 6-bit parity bit data PD together to generate the 38-bit codeword CW.

In one embodiment of FIG. 3, the 32-bit data OD is in an all-zero pattern (i.e., a first data), and the 6-bit parity bit data PD can be calculated according to the following equation (1):

$$Mp \cdot \begin{bmatrix} 0 \\ 0 \\ \vdots \\ 0 \end{bmatrix} = \begin{bmatrix} p1 \\ \vdots \\ p6 \end{bmatrix} \quad (1)$$

After binary matrix multiplication, the six elements p1 to p6 of the parity data PD are all zeros. Then, the ECC encoder 131 inserts the six elements p1 to p6 into the 32-bit data to generate the codeword CW, so that the elements p1 to p6 are respective the $1^{st}$, $2^{nd}$, $4^{th}$, $8^{th}$, $15^{th}$, and $25^{th}$ bit of the codeword CW. As a result, the codeword CW generated by the ECC encoder 131 according to the data of the all-zero pattern will be 0000000000 0000000000 0000000000 00000000.

In one embodiment of FIG. 3, the 32-bit data OD is in an all-one pattern, and the 6-bit parity bit data PD can be calculated according to the following equation (2):

$$Mp \cdot \begin{bmatrix} 1 \\ 1 \\ \vdots \\ 1 \end{bmatrix} = \begin{bmatrix} p1 \\ \vdots \\ p6 \end{bmatrix} \quad (2)$$

After binary matrix multiplication, the six elements p1 to p6 of the parity data PD are all ones. Then, the ECC encoder 131 inserts the six elements p1 to p6 into the 32-bit data to generate the codeword CW, so that the elements p1 to p6 are respective the $1^{st}$, $2^{nd}$, $4^{th}$, $8^{th}$, $15^{th}$, and $25^{th}$ bit of the codeword CW. As a result, the codeword CW generated by the ECC encoder 131 according to the data of the all-one pattern will be 1111111111 1111111111 1111111111 11111111.

In one embodiment of FIG. 3, the 32-bit data OD is in a checkerboard pattern, and the 6-bit parity bit data PD can be calculated according to the following equation (3):

$$Mp \cdot \begin{bmatrix} 1 \\ 0 \\ 1 \\ 0 \\ \vdots \\ 1 \\ 0 \end{bmatrix} = \begin{bmatrix} p1 \\ \vdots \\ p6 \end{bmatrix} \quad (3)$$

After binary matrix multiplication, the six elements p1 to p6 of the parity data PD are 111110. Then, the ECC encoder 131 inserts the six elements p1 to p6 into the 32-bit data to generate the codeword CW, so that the elements p1 to p6 are respective the $1^{st}$, $2^{nd}$, $4^{th}$, $8^{th}$, $15^{th}$, and $25^{th}$ bit of the codeword CW. As a result, the codeword CW generated by the ECC encoder 131 according to the data of the checkerboard pattern will be 1111010110 1010110101 0101001010 10101010.

In one embodiment of FIG. 3, the 32-bit data OD is in an inverse checkerboard pattern, and the 6-bit parity bit data PD can be calculated according to the following equation (4):

$$Mp \cdot \begin{bmatrix} 0 \\ 1 \\ 0 \\ 1 \\ \vdots \\ 0 \\ 1 \end{bmatrix} = \begin{bmatrix} p1 \\ \vdots \\ p6 \end{bmatrix} \quad (4)$$

After binary matrix multiplication, the six elements p1 to p6 of the parity data PD are 000001. Then, the ECC encoder 131 inserts the six elements p1 to p6 into the 32-bit data to generate the codeword CW, so that the elements p1 to p6 are respective the $1^{th}$, $2^{nd}$, $4^{th}$, $8^{th}$, $15^{th}$, and $25^{th}$ bit of the codeword CW. As a result, the codeword CW generated by the ECC encoder 131 according to the data of the inverse checkerboard pattern will be 0000101001 0101001010 1010110101 01010101.

In light of the aforementioned embodiments, it should be known that when two data are one's complement of each other, two respective codewords generated by the ECC encoder 131 according to the two data will be one's complement of each other as well. In other words, one's complement of a codeword of the ECC encoder 131 is also a codeword of the same ECC encoder 131.

It should be noted that, the aforementioned encoding method of Lien code is not only directed to the specific input data as described, but all data is adapted for the encoding method of Lien code. One skilled in the art may input any arbitrary 32-bit data and its one's complement into the ECC encoder 131 using the Lien code as introduced in the embodiment (e.g., using the matrix Mp), and two codewords complement to each other will be generated respectively as a result of the encoding method of Lien Code.

Figure 4:
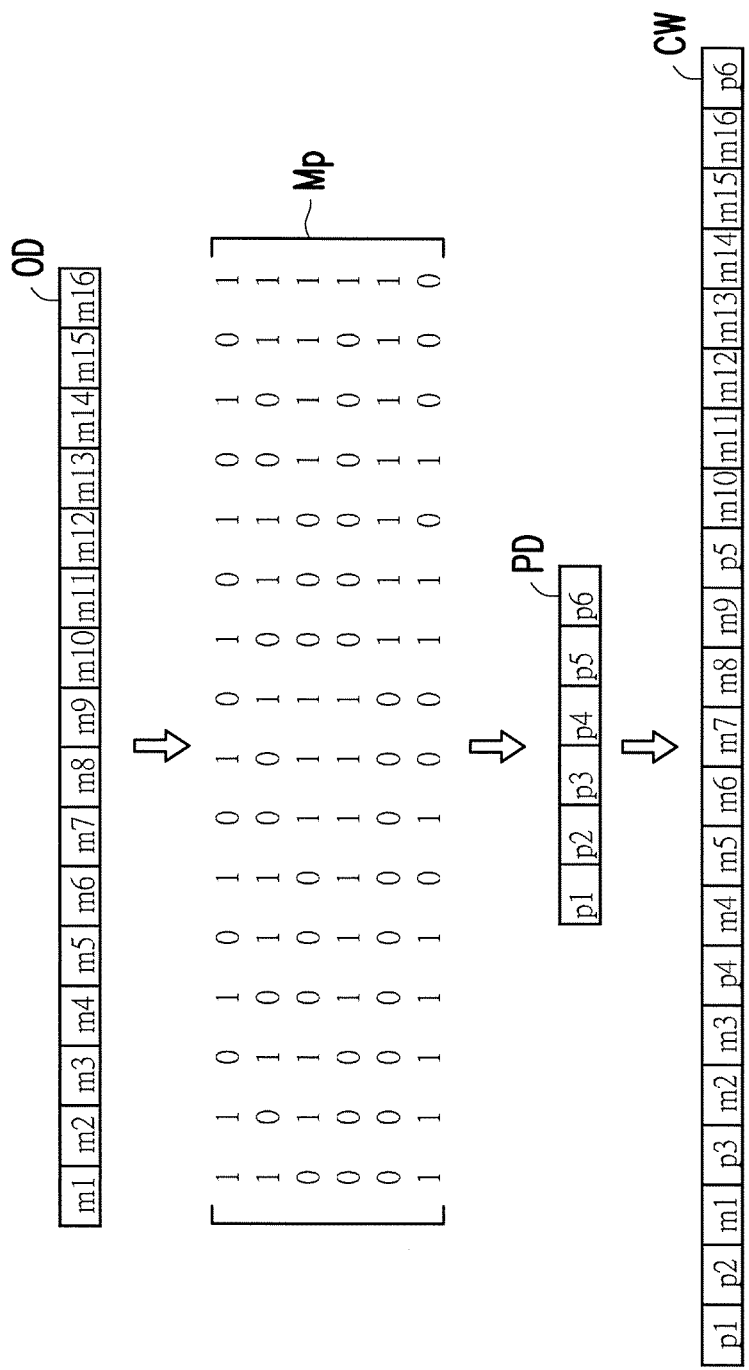
FIG. 4 is a schematic diagram illustrating an encoding method of a Lien Code modified by Hamming SECDED according to an embodiment of the invention.

Referring to FIG. 4, based on the Lien Code modified by Hamming SECDED, the ECC encoder 131 encodes a 16-bit data OD into a 22-bit codeword CW, and the matrix Mp is a 6*16 matrix used for calculating a 6-bit parity data PD of the 16-bit data OD. To be specific, the 16-bit data OD may be written in a one-column vector with 16 elements m1 to m16, then multiplied by the matrix Mp, so as to obtain a one-column vector with 6 elements p1 to p6 each represents one bit of the 6-bit parity data PD. Then, the ECC encoder 131 mixes the 16-bit data OD and the 6-bit parity bit data PD together to generate the 22-bit codeword CW.

In one embodiment of FIG. 4, the 16-bit data OD is in an all-zero pattern (i.e., a first data), and the 6-bit parity bit data PD can be calculated according to the following equation (5):

$$Mp \cdot \begin{bmatrix} 0 \\ 0 \\ \vdots \\ 0 \end{bmatrix} = \begin{bmatrix} p1 \\ \vdots \\ p6 \end{bmatrix} \quad (5)$$

After binary matrix multiplication, the six elements p1 to p6 of the parity data PD are all zeros. Then, the ECC encoder 131 inserts the six elements p1 to p6 into the 16-bit data to generate the codeword CW, so that the elements p1 to p6 are respective the $1^{st}$, $2^{nd}$, $4^{th}$, $7^{th}$, $14^{th}$, and $22^{th}$ bit of the codeword CW. As a result, the codeword CW generated by the ECC encoder 131 according to the data of the all-zero pattern will be 0000000000 0000000000 00.

In one embodiment of FIG. 4, the 16-bit data OD is in an all-one pattern, and the 6-bit parity bit data PD can be calculated according to the following equation (6):

$$Mp \cdot \begin{bmatrix} 1 \\ 1 \\ \vdots \\ 1 \end{bmatrix} = \begin{bmatrix} p1 \\ \vdots \\ p6 \end{bmatrix} \quad (6)$$

After binary matrix multiplication, the six elements p1 to p6 of the parity data PD are all ones. Then, the ECC encoder 131 inserts the six elements p1 to p6 into the 16-bit data to generate the codeword CW, so that the elements p1 to p6 are respective the $1^{st}$, $2^{nd}$, $4^{th}$, $7^{th}$, $14^{th}$, and $22^{th}$ bit of the codeword CW. As a result, the codeword CW generated by the ECC encoder 131 according to the data of the all-one pattern will be 1111111111 1111111111 11.

In one embodiment of FIG. 4, the 16-bit data OD is in a checkerboard pattern, and the 6-bit parity bit data PD can be calculated according to the following equation (7):

$$Mp \cdot \begin{bmatrix} 1 \\ 0 \\ 1 \\ 0 \\ \vdots \\ 1 \\ 0 \end{bmatrix} = \begin{bmatrix} p1 \\ \vdots \\ p6 \end{bmatrix} \quad (7)$$

After binary matrix multiplication, the six elements p1 to p6 of the parity data PD are 101110. Then, the ECC encoder 131 inserts the six elements p1 to p6 into the 32-bit data to generate the codeword CW, so that the elements p1 to p6 are respectively the $1^{st}$, $2^{nd}$, $4^{th}$, $7^{th}$, $14^{th}$, and $22^{th}$ bit of the codeword CW. As a result, the codeword CW generated by the ECC encoder 131 according to the data of the checkerboard pattern will be 1011011010 1011010101 00.

In one embodiment of FIG. 4, the 16-bit data OD is in an inverse checkerboard pattern, and the 6-bit parity bit data PD can be calculated according to the following equation (8):

$$Mp \cdot \begin{bmatrix} 0 \\ 1 \\ 0 \\ 1 \\ \vdots \\ 0 \\ 1 \end{bmatrix} = \begin{bmatrix} p1 \\ \vdots \\ p6 \end{bmatrix} \quad (8)$$

After binary matrix multiplication, the six elements p1 to p6 of the parity data PD are 010001. Then, the ECC encoder 131 inserts the six elements p1 to p6 into the 16-bit data to generate the codeword CW, so that the elements p1 to p6 are respectively the $1^{st}$, $2^{nd}$, $4^{th}$, $7^{th}$, $14^{th}$, and $22^{th}$ bit of the codeword CW. As a result, the codeword CW generated by the ECC encoder 131 according to the data of the inverse checkerboard pattern will be 0100100101 0100101010 11.

In light of the aforementioned embodiments, it should be known that when two data are one's complement of each other, two respective codewords generated by the ECC encoder 131 according to the two data will be one's complement of each other as well. In other words, one's complement of a codeword of the ECC encoder 131 is also a codeword of the same ECC encoder 131.

It should be noted that, the aforementioned encoding method of Lien code is not only directed to the specific input data as described, but all data is adapted for the encoding method of Lien code. One skilled in the art may input any arbitrary 16-bit data and its one's complement into the ECC encoder 131 using the Lien code as introduced in the embodiment (e.g., using the matrix Mp), and two codewords complement to each other will be generated respectively as a result of the encoding method of Lien Code.

Figure 5:
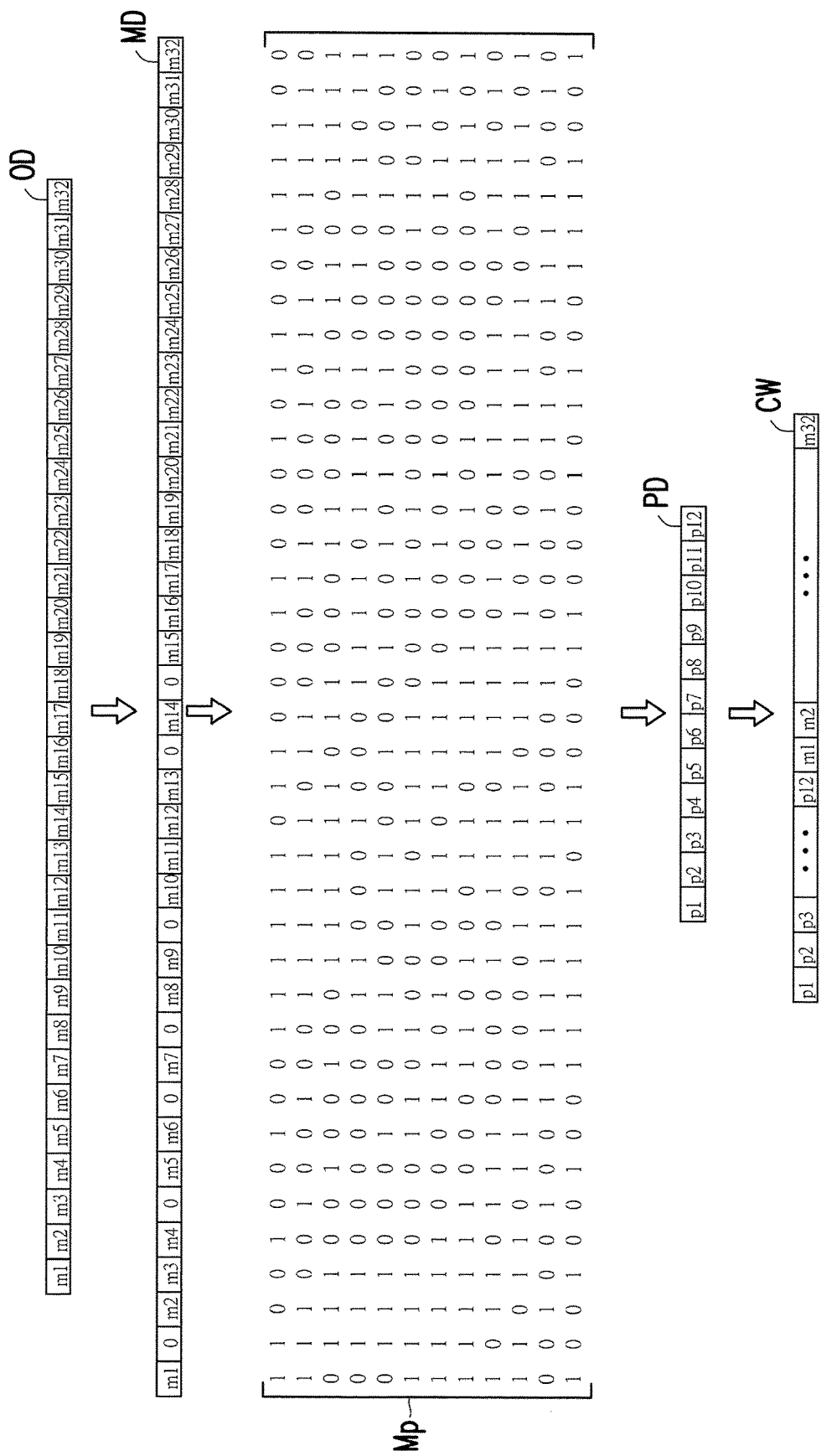
FIG. 5 is a schematic diagram illustrating a Lien code modified by BCH (44, 32, 5), encoding method according to another embodiment of the invention.

Referring to FIG. 5, based on the Lien Code modified by BCH (44, 32, 5), the ECC encoder 131 encodes a 32-bit data OD into a 44-bit codeword CW, and the matrix Mp is a 12*39 matrix used for calculating a 12-bit parity data PD of the 32-bit data OD. To be specific, the 32-bit data OD is expanded into a 39-bit data MD by inserting seven bits of "0" to the 32-bit data OD in advance, so as to generate the 39-bit data MD with the $2^{nd}$, $6^{th}$, $9^{th}$, $11^{th}$, $14^{th}$, $19^{th}$ and $21^{th}$ bits are the inserted "0". The 39-bit data MD may be written in a one-column vector with 39 elements m1 to m32 and seven zeros as shown in FIG. 5, where the 32 elements m1 to m32 represent 32 bits of the data OD. The 39-bit data MD is then multiplied by the matrix Mp, so as to obtain a one-column vector with 12 elements p1 to p12 each represents one bit of the 12-bit parity data PD. Then, the ECC encoder 131 attaches the 32-bit data OD to the 12-bit parity bit data PD to generate the 44-bit codeword CW.

In one embodiment of FIG. 5, the 32-bit data OD is in an all-zero pattern, and being modified as the 39-bit data MD in the all-zero pattern as well. The 12-bit parity bit data PD can be calculated according to the following equation (9):

$$Mp \cdot \begin{bmatrix} 0 \\ 0 \\ 0 \\ 0 \\ \vdots \\ 0 \\ 0 \end{bmatrix} = \begin{bmatrix} p1 \\ p2 \\ \vdots \\ p12 \end{bmatrix} \quad (9)$$

After binary matrix multiplication, the twelve elements p1 to p12 of the parity data PD are all zeros. Then, the ECC encoder 131 attaches the 32-bit data OD to the 12-bit parity bit data PD to generate the 44-bit codeword CW. As a result, the codeword CW generated by the ECC encoder 131 according to the data of the all-zero pattern will be 0000000000 0000000000 0000000000 0000000000 0000.

In one embodiment of FIG. 5, the 32-bit data OD is in an all-one pattern, and being modified as the 39-bit data MD in a pattern of 1011101101 0110111101 0111111111 111111111. The 12-bit parity bit data PD can be calculated according to the following equation (10):

$$Mp \cdot \begin{bmatrix} 1 \\ 0 \\ 1 \\ 1 \\ \vdots \\ 1 \\ 1 \end{bmatrix} = \begin{bmatrix} p1 \\ p2 \\ \vdots \\ p12 \end{bmatrix} \quad (10)$$

After binary matrix multiplication, the twelve elements p1 to p12 of the parity data PD are all ones. Then, the ECC encoder 131 attaches the 32-bit data OD to the 12-bit parity bit data PD to generate the 44-bit codeword CW. As a result, the codeword CW generated by the ECC encoder 131 according to the data of the all-one pattern will be 1111111111 1111111111 1111111111 1111111111 1111.

In one embodiment of FIG. 5, the 32-bit data OD is in a checkerboard pattern, and being modified as the 39-bit data MD in a pattern of 1001001001 0010010100 0101010101 010101010. The 12-bit parity bit data PD can be calculated according to the following equation (11):

$$Mp \cdot \begin{bmatrix} 1 \\ 0 \\ 0 \\ 1 \\ \vdots \\ 1 \\ 0 \end{bmatrix} = \begin{bmatrix} p1 \\ p2 \\ \vdots \\ p12 \end{bmatrix} \quad (11)$$

After binary matrix multiplication, the twelve elements p1 to p12 of the parity data PD are 1111001100 10. Then, the ECC encoder 131 attaches the 32-bit data OD to the 12-bit parity bit data PD to generate the 44-bit codeword CW. As a result, the codeword CW generated by the ECC encoder 131 according to the data of the checkerboard pattern will be 1111001100 1010101010 1010101010 1010101010 1010.

In one embodiment of FIG. 5, the 32-bit data OD is in an inverse checkerboard pattern, and being modified as the 39-bit data MD in a pattern of 0010100100 0100101001 0010101010 101010101. The 12-bit parity bit data PD can be calculated according to the following equation (12):

$$Mp \cdot \begin{bmatrix} 0 \\ 0 \\ 1 \\ 0 \\ \vdots \\ 0 \\ 1 \end{bmatrix} = \begin{bmatrix} p1 \\ p2 \\ \vdots \\ p12 \end{bmatrix} \quad (12)$$

After binary matrix multiplication, the twelve elements p1 to p12 of the parity data PD are 0000110011 01. Then, the ECC encoder 131 attaches the 32-bit data OD to the 12-bit parity bit data PD to generate the 44-bit codeword CW. As a result, the codeword CW generated by the ECC encoder 131 according to the data of the inverse checkerboard pattern will be 0000110011 0101010101 0101010101 0101010101 0101.

As encoded by the encoding methods of the Lien Code illustrated in the embodiments of FIG. 3 and FIG. 4, when two data are one's complement of each other, two respective codewords generated by the ECC encoder 131 according to the two data will be one's complement of each other as well. In other words, one's complement of a codeword of the ECC encoder 131 is also a codeword of the same ECC encoder 131.

It should be noted that, the aforementioned encoding method of Lien code is not only directed to the specific input data as described, but all data is adapted for the encoding method of Lien code. One skilled in the art may input any arbitrary 32-bit data and its one's complement into the ECC encoder 131 using the Lien code as introduced in the embodiment (e.g., using the matrix Mp), and two codewords complement to each other will be generated respectively as a result of the encoding method of Lien Code.

Figure 6:
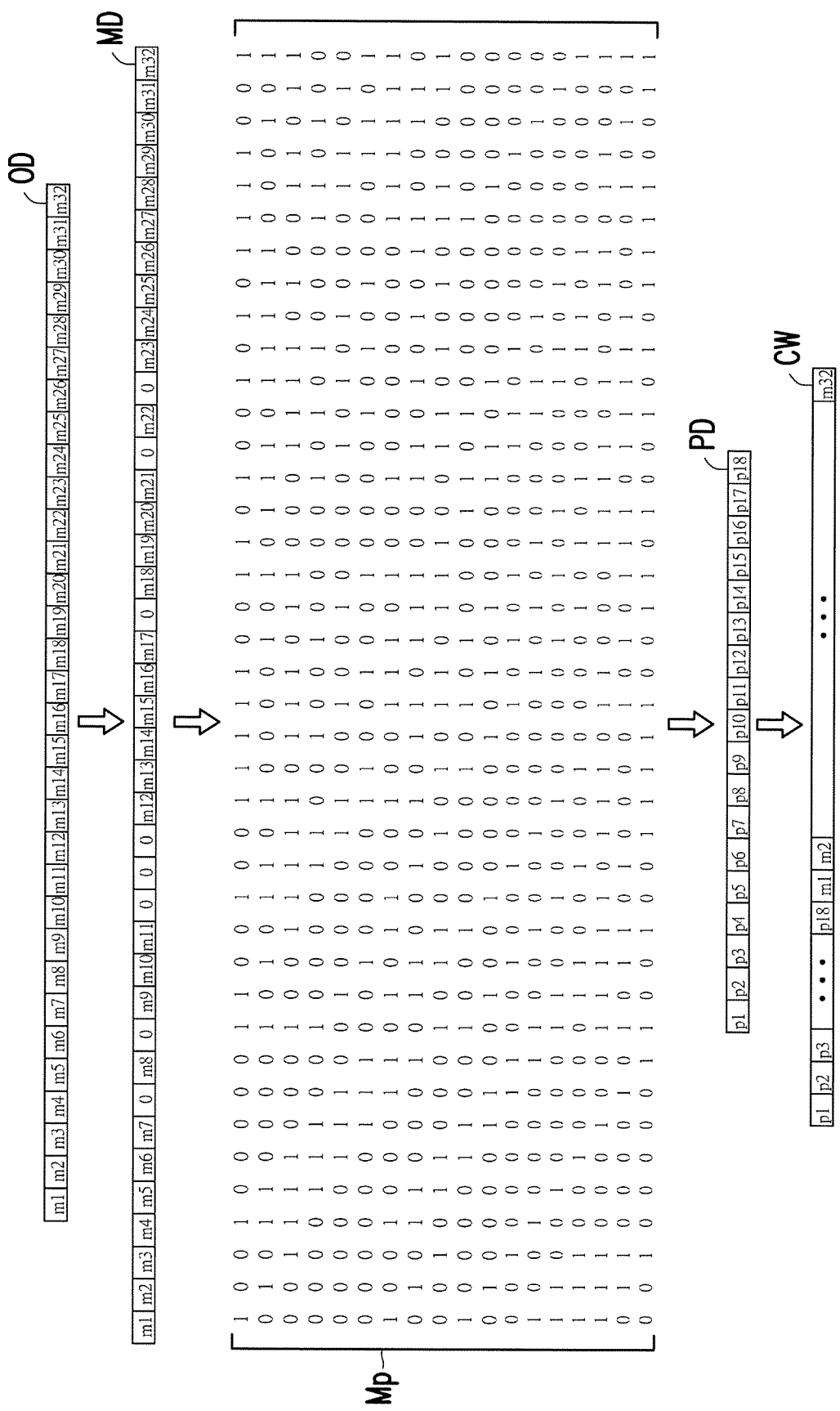
FIG. 6 is a schematic diagram illustrating a Lien code modified by BCH (50, 32, 7), encoding method according to another embodiment of the invention.

Referring to FIG. 6, based on the Lien Code modified by BCH (50, 32, 7), the ECC encoder 131 encodes a 32-bit data OD into a 50-bit codeword CW, and the matrix Mp is an 18*40 matrix used for calculating an 18-bit parity data PD of the 32-bit data OD. To be specific, the 32-bit data OD is expanded into a 40-bit data MD by inserting eight bits of "0" to the 32-bit data OD in advance, so as to generate the 40-bit data MD with the $8^{th}$, $10^{th}$, $14^{th}$, $15^{th}$, $16^{th}$, $23^{rd}$, $28^{th}$ and $30^{th}$ bits are the inserted "0". The 40-bit data MD may be written in a one-column vector with 40 elements m1 to m32 and eight zeros as shown in FIG. 6, where the 32 elements m1 to m32 represent 32 bits of the data OD. The 40-bit data MD is then multiplied by the matrix Mp, so as to obtain a one-column vector with 18 elements p1 to p18 each represents one bit of the 18-bit parity data PD. Then, the ECC encoder 131 attaches the 32-bit data OD to the 18-bit parity bit data PD to generate the 50-bit codeword CW.

In one embodiment of FIG. 6, the 32-bit data OD is in an all-zero pattern, and being modified as the 40-bit data MD in the all-zero pattern as well. The 18-bit parity bit data PD can be calculated according to the following equation (13):

$$Mp \cdot \begin{bmatrix} 0 \\ 0 \\ 0 \\ 0 \\ \vdots \\ 0 \\ 0 \end{bmatrix} = \begin{bmatrix} p1 \\ p2 \\ \vdots \\ p18 \end{bmatrix} \quad (13)$$

After binary matrix multiplication, the eighteen elements p1 to p18 of the parity data PD are all zeros. Then, the ECC encoder 131 attaches the 32-bit data OD to the 18-bit parity bit data PD to generate the 50-bit codeword CW. As a result, the codeword CW generated by the ECC encoder 131 according to the data of the all-zero pattern will be 0000000000 0000000000 0000000000 0000000000 0000000000.

In one embodiment of FIG. 6, the 32-bit data OD is in an all-one pattern, and being modified as the 40-bit data MD in a pattern of 1111111010 1110001111 1101111010 1111111111. The 18-bit parity bit data PD can be calculated according to the following equation (14):

$$Mp \cdot \begin{bmatrix} 1 \\ 1 \\ 1 \\ 1 \\ \vdots \\ 1 \\ 1 \end{bmatrix} = \begin{bmatrix} p1 \\ p2 \\ \vdots \\ p18 \end{bmatrix} \quad (14)$$

After binary matrix multiplication, the eighteen elements p1 to p18 of the parity data PD are all ones. Then, the ECC encoder 131 attaches the 32-bit data OD to the 18-bit parity bit data PD to generate the 50-bit codeword CW. As a result, the codeword CW generated by the ECC encoder 131 according to the data of the all-one pattern will be 1111111111 1111111111 1111111111 1111111111 1111111111.

In one embodiment of FIG. 6, the 32-bit data OD is in a checkerboard pattern, and being modified as the 40-bit data MD in a pattern of 1010101000 1010000101 0100101000 1010101010. The 18-bit parity bit data PD can be calculated according to the following equation (15):

$$Mp \cdot \begin{bmatrix} 1 \\ 0 \\ 1 \\ 0 \\ \vdots \\ 1 \\ 0 \end{bmatrix} = \begin{bmatrix} p1 \\ p2 \\ \vdots \\ p18 \end{bmatrix} \quad (15)$$

After binary matrix multiplication, the eighteen elements p1 to p18 of the parity data PD are 0100111100 11111100. Then, the ECC encoder 131 attaches the 32-bit data OD to the 18-bit parity bit data PD to generate the 50-bit codeword CW. As a result, the codeword CW generated by the ECC encoder 131 according to the data of the checkerboard pattern will be 0100111100 1111110010 1010101010 1010101010 1010101010.

In one embodiment of FIG. 6, the 32-bit data OD is in an inverse checkerboard pattern, and being modified as the 40-bit data MD in a pattern of 0101010010 0100001010 1001010010 0101010101. The 18-bit parity bit data PD can be calculated according to the following equation (16):

$$Mp \cdot \begin{bmatrix} 0 \\ 1 \\ 0 \\ 1 \\ \vdots \\ 0 \\ 1 \end{bmatrix} = \begin{bmatrix} p1 \\ p2 \\ \vdots \\ p18 \end{bmatrix} \quad (16)$$

After binary matrix multiplication, the eighteen elements p1 to p18 of the parity data PD are 1011000011 00000011. Then, the ECC encoder 131 attaches the 32-bit data OD to the 18-bit parity bit data PD to generate the 50-bit codeword CW. As a result, the codeword CW generated by the ECC encoder 131 according to the data of the inverse checkerboard pattern will be 1011000011 0000001101 0101010101 0101010101 0101010101.

As encoded by the encoding methods of the Lien Code illustrated in the embodiments of FIGS. 3 to 5, when two data are one's complement of each other, two respective codewords generated by the ECC encoder 131 according to the two data will be one's complement of each other as well. In other words, one's complement of a codeword of the ECC encoder 131 is also a codeword of the same ECC encoder 131.

It should be noted that, the aforementioned encoding method of Lien code is not only directed to the specific input data as described, but all data is adapted for the encoding method of Lien code. One skilled in the art may input any arbitrary 32-bit data and its one's complement into the ECC encoder 131 using the Lien code as introduced in the embodiment (e.g., using the matrix Mp), and two codewords complement to each other will be generated respectively as a result of the encoding method of Lien Code.

It should be noted that the encoding formula or algorithm of the encoding method adopted by the ECC encoder 131 is not limited by that introduced in the exemplary embodiments of FIGS. 3 to 6. For example, the encoding formula or algorithm of the Lien Code may be implemented based on any of the BCH code, the hamming code, the hamming code with additional parity (SECDED), the Reed-Solomon code, or the Hsiao code, etc., which is not limited herein. Enough teaching, suggestion, and implementation illustration for aforesaid steps and embodiments thereof may be obtained with reference to common knowledge in the related art, which is not repeated hereinafter.

In one embodiment of the invention, the host system may issue a write command for writing a first data into the memory array 150, and the memory control circuit 130 may receive the first data through the connection interface 110. In response to the write command, the memory control circuit 130 may perform the encoding operation based on the Lien Code introduced before to generate a first codeword according to the first data, and write the generated first codeword into the memory array 150. In the embodiment, the host system may issue another write command for writing a second data which is one's complement of the first data into the memory array 150, and the memory control circuit 130 may receive the second data through the connection interface 110. In response to the received write command, the memory control circuit 130 may perform the encoding operation based on the Lien Code introduced before to generate a second codeword according to the second data, and write the generated second codeword into the memory array 150. In which, the generated second codeword may be one's complement of the first codeword.

In the embodiment, the host system may further issue a write command for writing a third data into the memory array 150, and the memory control circuit 130 may receive the third data through the connection interface 110. In response to the write command, the memory control circuit 130 may perform the encoding operation of the Lien Code introduced before to generate a third codeword according to the third data, and write the generated third codeword into the memory array 150. In the embodiment, the host system may further issue another write command for writing a fourth data which is one's complement of the third data into the memory array 150, and the memory control circuit 130 may receive the fourth data through the connection interface 110. In response to the received write command, the memory control circuit 130 may perform the encoding operation based on the Lien Code introduced before to generate a fourth codeword according to the fourth data, and write the generated fourth codeword into the memory array 150. In which, the first, second, third, and fourth data are different from each other, and the generated fourth codeword may be one's complement of the third codeword.

In summary, by adopting the encoding method and the memory storage apparatus provided in the invention, one's complement of a codeword generated by the ECC encoder using the Lien Code is also another codeword of the ECC encoder using the Lien Code, therefore a pair of a codeword and one's complement of the codeword can be easily generated by using the Lien Code. Accordingly, memory cells of a memory storage apparatus can be easily cycled, and the endurance of the memory storage apparatus can be conveniently tested.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An encoding method for a memory storage apparatus adopting a Lien ECC scheme, comprising:
receiving a first data or a second data, wherein the second data is one's complement of the first data; and
performing an encoding operation based on a Lien Code by an ECC encoder, wherein the memory storage apparatus comprises the ECC encoder using the Lien Code, wherein the encoding operation comprises:
when the first data is received, generating a first codeword according to the first data; and
when the second data is received, generating a second codeword according to the second data, wherein the second codeword is one's complement of the first codeword,
wherein one's complement of any codeword generated by the Lien Code is a codeword generated by the Lien Code.

2. The encoding method as claimed in claim 1, wherein generating the first codeword according to the first data comprises:
calculating a first parity data of the first data based on the Lien Code by the ECC encoder; and
combing the first parity data and the first data to generate the first codeword, and wherein generating the second codeword according to the second data comprises:
calculating a second parity data of the second data based on the Lien Code by the ECC encoder; and
combing the second parity data and the second data to generate the second codeword.

3. The encoding method as claimed in claim 2, wherein each of the first data and the first parity data is in an all-zero pattern, and each of the second data and the second parity data is in an all-one pattern.

4. The encoding method as claimed in claim 2, wherein each of the first data and the first parity data is in a checkerboard pattern, and each of the second data and the second parity data is in an inverse checkerboard pattern.

5. The encoding method as claimed in claim 1, further comprising:
receiving a third data or a fourth data, wherein the fourth data is one's complement of the third data, wherein the first, second, third, and fourth data are different from each other;
performing the encoding operation by the ECC encoder using the Lien Code in response to the third data or the fourth data received, wherein the encoding operation further comprises:
if the third data is received, generating a third codeword according to the third data; and
if the fourth data is received, generating a fourth codeword according to the fourth data, wherein the fourth codeword is one's complement of the third codeword.

6. The encoding method as claimed in claim 1, further comprising:
writing the generated first or second codeword into a memory array of the memory storage apparatus.

7. A memory storage apparatus adopting a Lien ECC scheme using a Lien Code, comprising:
a connection interface configured to couple to a host system;
a memory array; and
a memory control circuit coupled to the connection interface and the memory array, wherein the memory control circuit is configured to receive a first data or a second data, wherein the second data is one's complement of the first data,
wherein the memory control circuit performs an encoding operation based on the Lien Code in response to the first data or the second data received, wherein the encoding operation comprises:
when the first data is received by the memory control circuit, generating a first codeword according to the first data; and
when the second data is received by the memory control circuit, generating a second codeword according to the second data, wherein the second codeword is one's complement of the first codeword,
wherein one's complement of any codeword generated by the Lien Code is a codeword generated by the Lien Code.

8. The memory storage apparatus as claimed in claim 7, wherein the first codeword comprises the first data and a first parity data, the second codeword comprises the second data and a second parity data, and the second parity data is one's complement of the first parity data.

9. The memory storage apparatus as claimed in claim 8, wherein each of the first data and the first parity data is in an all-zero pattern, and each of the second data and the second parity data is in an all-one pattern.

10. The memory storage apparatus as claimed in claim 8, wherein each of the first data and the first parity data is in a checkerboard pattern, and each of the second data and the second parity data is in an inverse checkerboard pattern.

11. The memory storage apparatus as claimed in claim 7, wherein the memory control circuit is further configured to receive a third data or a fourth data, wherein the fourth data is one's complement of the third data, wherein the first, second, third, and fourth data are different from each other,
wherein the memory control circuit performs the encoding operation based on the Lien Code in response to the third data or the fourth data received, wherein the encoding operation further comprises:
if the third data is received by the memory control circuit, generating a third codeword according to the third data; and
if the fourth data is received by the memory control circuit, generating a fourth codeword according to the fourth data, wherein the fourth codeword is one's complement of the third codeword.

12. The memory storage apparatus as claimed in claim 7, wherein the memory control circuit further writes the generated first or second codeword into the memory array.

13. The memory storage apparatus as claimed in claim 7, wherein the memory control circuit comprises an ECC encoder using the Lien Code.

14. The memory storage apparatus as claimed in claim 7, wherein the memory storage apparatus is a rewritable non-volatile memory.

* * * * *